Jan. 27, 1942.  C. VOORHIES  2,271,412
INTERNAL COMBUSTION ENGINE
Filed March 22, 1940   2 Sheets-Sheet 1

INVENTOR.
Carl Voorhies
BY John F. Stark
ATTORNEY.

Patented Jan. 27, 1942

2,271,412

UNITED STATES PATENT OFFICE 2,271,412

INTERNAL COMBUSTION ENGINE

Carl Voorhies, Detroit, Mich., assignor to Eaton Manufacturing Company, Cleveland, Ohio, a corporation of Ohio Application March 22, 1940, Serial No. 325,288

5 Claims. (Cl. 123—90)

This invention relates to internal combustion engines in general and more particularly concerns a camshaft therefor with cam means thereon timing the valve gearing according to the individual requirements of each of the cylinders thereof so as to secure the optimum timing in the engine.

In automobile engine practice, in fact in all internal combustion engines, heretofore it has been usual to set the valve timing according to the degree of crankshaft angle or the degree of piston position in all cylinders alike. That is to say, there is a single timing for the valve mechanism as a whole which is effected according to either of the methods selected. It is known that these and other known methods of valve gear timing are at best a compromise of the ultimate power characteristics which may be developed in the engine, and that inequalities in compression curves recorded from the individual cylinders is compensated by restrictions of calculated size and shape designed into the intake manifold. It is also known that in present engines with a single timing, the valve timing can be moved a considerable number of degrees forward or backward of the designated timing point without materially altering the power characteristics of the engine. This is believed due to the fact that the load on the engine is being moved from one cylinder to another instead of being changed, consequently the engine is not very sensitive to valve timing.

Investigation has determined that with a given engine in use at present, or pending designs in the future of the same general type and principle, that the engine may be made very sensitive to valve timing by observance of the following discovered facts: In a multiple cylinder engine having different lengths of travel from the origin of the carbureted fuel mixture to the inlet valve ports of the several cylinders disposed at said various distances therefrom, a given suction effect in the inlet manifold, which may be assumed equal for all the cylinders, will induce or set in motion a given length column of fuel mixture in a certain length of time and which will have a certain inertia flow that sustains for a proportional time interval, whereas a relatively shorter column of fuel mixture will be set in motion in a lesser time interval and will likewise have an inertia flow that dies out in a correspondingly shorter time. This is, of course, assuming there are no variations in restrictions or bends in the manifold design between the separate cylinders which would materially affect the results of the individual cylinders operated under this principle. Therefore, in order to take advantage of the ramming or packing of the cylinders by the moving fuel mixtures having different inertia flows or kinetic energy, necessitates that the intake valves on the separate cylinders be held open a greater or lesser time in accordance with the inertia flow of the fuel mixture, so as to admit a maximum charge of fuel before the inertia flow dies out and the intake valve thus closed before the charge packed in the cylinder thereby begins to back out.

Compression curves recorded from an engine operated under this method of timing, reveal values that are more nearly alike for the individual cylinders and consequently will tend to make the engine more sensitive to valve timing so that the power would be increased at the lower end and decreased at the top end by closing the intake valves, fed from a short and long length manifold, closer to bottom center but maintaining their relative positions. Further, the power would be increased at the top end and decreased at the bottom end of the speed range by closing these same valves relatively later but maintaining their relative positions. It is obvious that due to the shape or area of one manifold length to another that the effective length might not be directly proportional to their actual linear dimensions. It is believed that a manifold in which the effective lengths are directly proportional to their actual dimensions is better for carrying out the teaching of this invention. The use of the term effective length will be understood as meaning the ability of a relatively short manifold to indicate a timing requirement which would normally be used for a relatively longer manifold. In other words, its effect on the timing requirements. Accordingly, to this end, the present invention provides a camshaft designed to utilize thse findings and having cams thereon disposed in accordance with the aforementioned teaching for operating the valve mechanism of an internal combustion engine.

Among the objects of this invention is the provision of means for actuating the valve mechanism of an internal combustion engine, comprising a camshaft having a plurality of cams thereon angularly disposed in accordance with the optimum power characteristics of the individual cylinders of the engine; the provision of means for actuating the valve mechanism of an internal combustion engine, comprising a camshaft having individual cam contours designed to accommodate the optimum valve timing of the individual cylinders of the engine according to the length of intake manifold thereto from the source of carbureted fuel mixture; the provision of means for actuating the intake valve mechanism of an internal combustion engine, comprising a camshaft having a plurality of cams thereon which control the closing event of the intake valves of the separate cylinders of the engine in accordance with their respective distances from the source of fuel mixture fed thereto; the provision of means in an internal combustion engine, having different manifold lengths, for actuating the valve mechanism, comprising a camshaft having a plurality of cams thereon which control the valve event of the separate cylinders of the engine in accordance with the effective manifold lengths thereto, and not necessarily the actual linear dimensions thereof.

Further and other objects of the invention reside in the novel combination and arrangement of parts herein disclosed in conjunction with the drawings forming a part of this specification and pointed out with particularity in the appended claims.

In the drawings like reference characters denote corresponding parts throughout the several views, and in which:

Fig. 1 is a plan view of an intake manifold of an engine illustrating somewhat diagrammatically the distances from the central source of fuel supply to the individual cylinders fed thereby; and Fig. 2 is a diagrammatic illustration of the relative intake valve event with reference to crankshaft angle for the four different lengths of intake manifold shown in Fig. 1; and Fig. 3 is a partial elevational view of a camshaft, with four intake valves shown diagrammatically mounted thereon, and broken along its longitudinal length to show the cams thereof displaced from normal and in aligned relation; and Figs. 4, 5, 6 and 7 are vertical sectional views through the camshaft of Fig. 3 taken on the lines 4—4, 5—5, 6—6 and 7—7, respectively, to illustrate somewhat diagrammatically the relative duration of the intake valve event provided by the camshaft for the several manifold lengths of Fig. 1.

Figure 1:
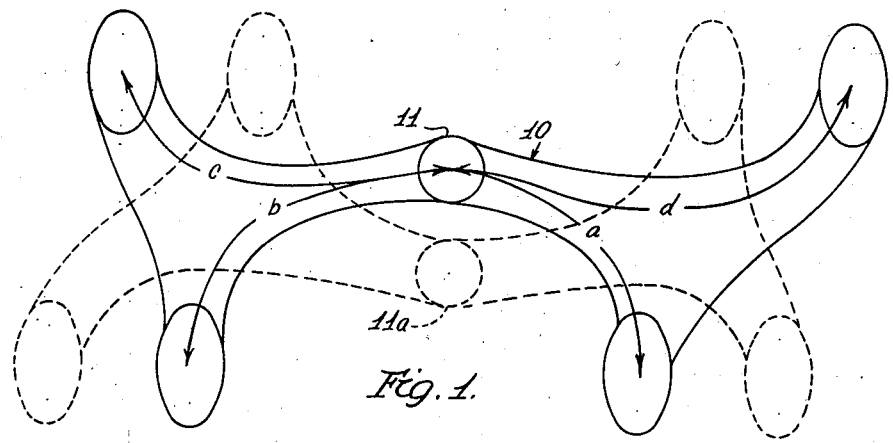
Figure 2:
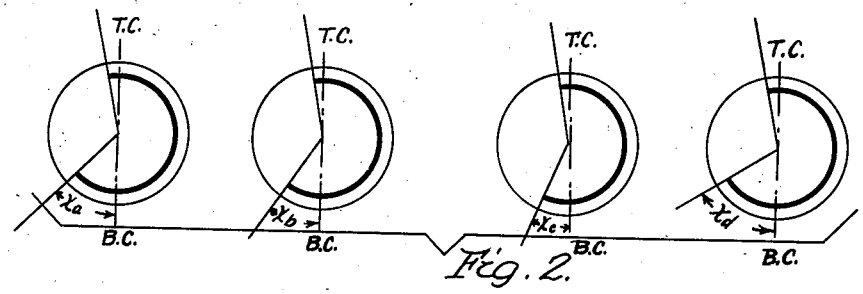
Figure 3:
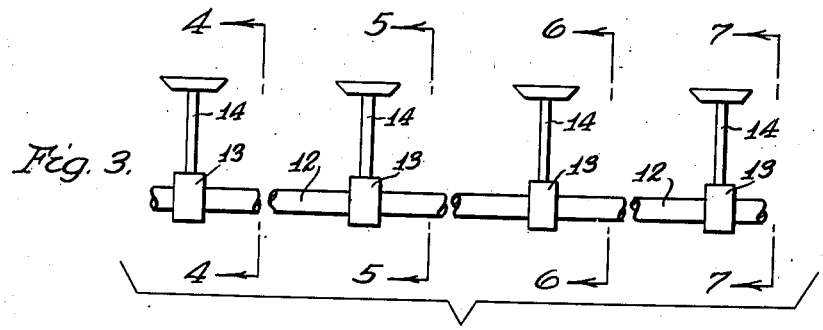
Figure 4:
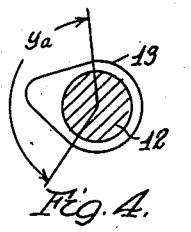
Figure 5:
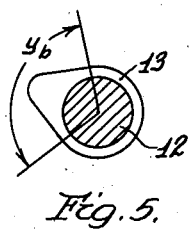
Figure 6:
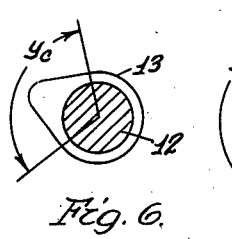
Figure 7:
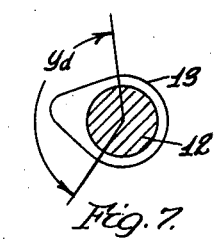

In the drawings, having a particular reference to Figs. 1 and 2, there is shown an intake manifold, generally designated by the numeral 10, for an eight cylinder V type engine, the broken line portions thereof representing the lower level of manifold run which is a duplicate of the upper level shown in full lines. For purposes of illustration, the source of fuel mixture from the carburetor is introduced into the manifold at the aperture 11, for the upper level of manifold, and at a similar adjacent aperture 11a for the lower level of manifold, shown by broken lines. The point of introduction of the carbureted fuel mixture to the manifold is shown as being slightly off center between the oppositely extending channels so as to better illustrate the teaching of this invention thus providing four different manifold lengths, designated by numerals a, b, c, d, having lengths of progressive orders, respectively. In this discussion only the upper manifold level, shown in full lines, will be described as the lower level is a duplicate of the several lengths thereof.

Applying the teaching of this invention, since the induced flow of carbureted fuel mixture in each length of the intake manifold is caused by the suction effect created by the reciprocation of the pistons in the individual cylinders of the engine to which the manifold feeds its charge into the combustion chambers adjacent the upper ends thereof, and, assuming that the suction effect is equal for all the cylinders, it follows that a relatively longer time interval will be necessary to set in motion the column of fuel mixture for the long manifold length d, than for the short manifold length a, and intermediate time intervals for each of the manifold lengths b and c. Likewise, once the fuel mixtures for the manifold lengths a and d have been set in motion their respective inertia flows will be sustained for unlike time intervals. That is to say, the kinetic energy of the moving columns of fuel mixture will produce a greater ramming or packing effect of the charge in the cylinder fed by manifold length d than it would for manifold length a. Accordingly, to take advantage of this effect and receive the maximum benefit therefrom, the intake valves of the cylinders fed by manifold lengths d and c should be closed at different intervals, in other words, the duration of intake valve event should be such that the valve is held open only until the full force of the inertia flow of the fuel charge has been expended, and before the gas partially compressed thereby has an opportunity to begin backing out of the cylinder. In the diagrammatic illustration of Fig. 2, there is shown the intake valve event for the four different lengths of manifold shown in Fig. 1, with respect to the crankshaft angle, and designated by the letter X with a subscript corresponding to each manifold length. It will thus be seen that although all the intake valves are opened in the same relative angular position before top center, designated by initials T. C., they are closed at various angular positions beyond bottom center, designated by initials B. C., in direct proportion to the several manifold lengths designated thereby. It is obvious of course to those skilled in the art that the heavy arcuate line represents the duration of valve open event.

In Figs. 3–7 inclusive, the camshaft generally designated by the numeral 12, has cams 13 peripherally disposed thereon which actuate intake valves generally designated 14. It will be seen that the camshaft 12 has been broken at several points along its longitudinal length so as to line up the several intake cams 13 shown thereon, which is merely for convenience of illustration, and in actual practice these cams would be disposed at various angles around the perimeter of the camshaft body. Likewise, it will be understood that the intake valves 14, shown in direct contact with the cams 13, in actual practice are actuated by tappet members having a cam contacting face and a valve contacting end interposed between the valve stem end and the cam so that either a manual valve clearance adjustment may thus be affected or automatic compensation provided therebetween. In the vertical sectional views shown in Figs. 4–7 inclusive, the cams 13 of the camshaft 12, have also been alined from their normal angular disposition and illustrate the approximate duration of cam travel to effect the individual events of the intake valves. It will be understood that these showings have been somewhat exaggerated, as actually the machining on the separate cam contours would be only a matter of a few degrees variation and not discernible on a drawing of this character. Since the camshaft of an internal combustion engine conventionally operates at one-half crankshaft speed, it is apparent that the respective angles $Ya$, $Yb$, $Yc$ and $Yd$ imposed thereon to show the intake valve open event, are actually only one-half of the several respective intake valve events shown in Fig. 2, represented by the heavy arcuate lines.

Figure 8:
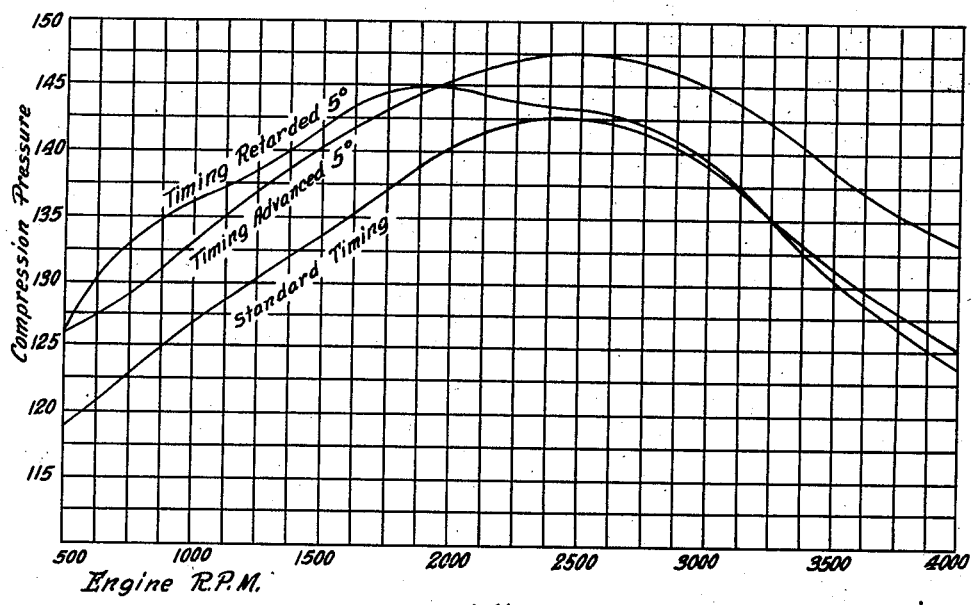
Fig. 8 is a diagram of a compression curve for an individual cylinder of a multi-cylinder internal combustion engine with standard timing and comparatively illustrating the effects of different timing imposed thereon.
Figure 9:
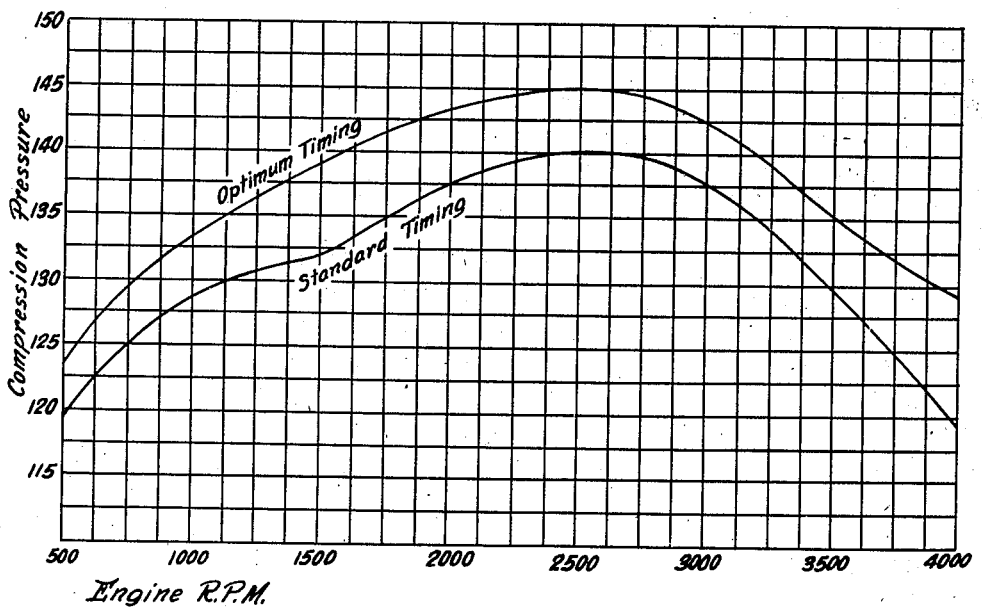
Fig. 9 is a composite diagram of the compression curve for the total number of cylinders in an engine according to standard timing and including a comparative compression curve of the total cylinders for the optimum timing thereof according to this invention.

For further evidence of the efficacy of this invention, there is shown in Fig. 8 a diagram of the compression curve of a single cylinder taken from the multi-cylinder engine of the V-type as represented by the intake manifold in Fig. 1, and comparatively illustrating the effects of standard timing as against separate retarded and advanced timing diagrams. From this, it will be evident the wide variations in power characteristics that may be obtained from a single cylinder simply by altering the intake valve timing thereof; for example, the particular power characteristics may be selected for development at low engine revolutions, as represented by the abscissae of the diagram, and the compression pressures, as represented by the ordinates of the diagram, dependent on whether the engine is designed for pleasure or commercial usage. In the complete application of this principle to an engine, of course, compression curves for the several cylinders comprising the engine are individually recorded and a composite diagram representing the best timing for the individual cylinders is used. For purposes of illustration, there is shown in Fig. 9 such a composite diagram in which the compression curve for standard timing has ordinates materially less than that for the same engine with what is chosen to be known as optimum timing, and these variations in values extend throughout the normal speed range of the engine.

From the foregoing disclosures, it will be apparent that a novel method and camshaft means for substantially improving the performance characteristics of an engine have been described, accomplishing among other things the objects and advantages of the invention first enumerated; and it is not the intention to be limited to the specific embodiment of the invention herein shown, as in actual practice many formal variations therefrom will be found, but to include within the scope of the broad invention, the spirit and substance thereof as defined by the following claims.

What I claim is:

1. The combination with an internal combustion engine having a plurality of intake valves arranged at unlike distances from a central source of carbureted fuel mixture, of an actuating camshaft therefor so constructed as to effect a valve open event for each valve proportionate to the distances from said fuel source.

2. The combination with a multi-cylinder internal combustion engine having a plurality of intake valves arranged at unequal distances from a central source of carbureted fuel mixture in communication with an engine intake manifold to control the fuel charge to the separate cylinders thereof, of an actuating camshaft for the said intake valves having individual cam contours effecting the valve open event for the separate cylinders of the engine according to the manifold distance from said source of fuel mixture.

3. The combination with a multi-cylinder internal combustion engine having a plurality of intake valves arranged to control the fuel charge fed thereto, said cylinders being disposed at unequal distances from a central source of fuel mixture and in communication with said valves through an intake manifold having commensurate lengths therebetween, of an actuating camshaft for said intake valves having cam contours arranged to open all said intake valves at the same relative preselected position and sustain the valve open event for each valve a time interval proportional to the distance thereof from said source of fuel mixture.

4. The combination in a multi-cylinder internal combustion engine having a plurality of intake valves arranged to control the fuel charge fed thereto, of a camshaft of the character described having a plurality of cam contours peripherally disposed thereon for actuating said valves and effecting the closing thereof at a point in each valve event which produces the best performance for the individual cylinders of the engine whereby the valve closing event occurs at different points relative to the strokes of the respective cylinders, said camshaft contours providing the sole means for producing said performance.

5. A camshaft of the character described for use in a multi-cylinder internal combustion engine having a plurality of valves arranged to control communication with the individual cylinders thereof, said camshaft so constructed and arranged with a plurality of integral cam contours peripherally disposed thereon as to produce a predetermined valve timing best suited to the individual cylinders of the engine whereby the valve closing event occurs at different points relative to the strokes of the respective cylinders, said camshaft contours providing the sole means for effecting said predetermined best valve timing.

CARL VOORHIES.